(12) United States Patent
Pape et al.

(10) Patent No.: US 7,650,783 B2
(45) Date of Patent: Jan. 26, 2010

(54) THERMAL MASS FLOW METER

(75) Inventors: Detlef Pape, Nussbaumen (CH); Ralf Huck, Grosskrotzenburg (DE)

(73) Assignee: ABB AG, Mannheim (DE)

(*) Notice: Subject to any disclaimer, the term of this patent is extended or adjusted under 35 U.S.C. 154(b) by 64 days.

(21) Appl. No.: 12/123,775

(22) Filed: May 20, 2008

(65) Prior Publication Data

US 2008/0289410 A1    Nov. 27, 2008

(30) Foreign Application Priority Data

May 21, 2007    (DE)    ........................ 10 2007 023 824

(51) Int. Cl.
  *G01F 1/68*    (2006.01)
(52) U.S. Cl. .................................. 73/204.11
(58) Field of Classification Search .. 73/204.11–204.26
  See application file for complete search history.

(56) References Cited

U.S. PATENT DOCUMENTS

| | | | |
|---|---|---|---|
| 3,623,364 A | 11/1971 | Withrow | |
| 4,332,157 A * | 6/1982 | Zemel et al. ............. | 73/204.16 |
| 4,885,937 A * | 12/1989 | Tanaka et al. ............ | 73/170.12 |
| 4,912,975 A | 4/1990 | Ohta et al. | |
| 5,033,299 A * | 7/1991 | Tanaka et al. ............ | 73/204.26 |
| 5,880,365 A | 3/1999 | Olin et al. | |
| 6,626,037 B1 * | 9/2003 | Wado et al. ............... | 73/204.26 |

FOREIGN PATENT DOCUMENTS

| | | |
|---|---|---|
| DE | 36 06 057 A1 | 8/1986 |
| DE | 102 22 499 A1 | 12/2003 |
| WO | WO 02/065078 A1 | 8/2002 |

OTHER PUBLICATIONS

German Search Report for corresponding German application No. 10 2007 023 824.1, dated Feb. 14, 2008.

* cited by examiner

*Primary Examiner*—Jewel Thompson
(74) *Attorney, Agent, or Firm*—Buchanan Ingersoll & Rooney PC

(57) ABSTRACT

The disclosure relates to a thermal mass flow meter for determining a material flow through a vessel. In this case, a heating element is mounted on a holder which is immersed into a vessel with a flowing medium. It is suggested that the holder is subdivided into two zones of differing thermal conductivity, the holder substantially having a high thermal conductivity adjoined by a short zone of low thermal conductivity in which the heating element is arranged.

12 Claims, 3 Drawing Sheets

THERMAL MASS FLOW METER

RELATED APPLICATION

This application claims priority under 35 U.S.C. §119 to German Patent Application No. 10 2007 023 824.1 filed in Germany on May 21, 2007, the entire content of which is hereby incorporated by reference in its entirety.

TECHNICAL FIELD

The disclosure relates to a thermal mass flow meter for determining a material flow through a vessel.

BACKGROUND INFORMATION

Such mass flow meters have long been known. The measuring principle of thermal mass flow meters is based on the cooling of a heating element mounted on a holder when immersed into a flowing fluid. The flow which flows over the surface of the heating element absorbs heat from the latter and thus cools the heating element. The construction and behavior are illustrated in principle in FIG. 3. In this case, the quantity of heat absorbed by the flow depends on the temperature difference between the surface and the fluid, and on the flow itself. It can be described by a function $$\dot{q} = \alpha (T_O - T_F),$$

where
$\dot{q}$ is the quantity of heat dissipated,
$(T_O - T_F)$ is the temperature difference, and
$\alpha$ is a constant of proportionality.

The constant of proportionality $\alpha$ is in this case directly dependent on the flow and is a function of the mass flow density over the heating element $\alpha = f(\rho v) \sim \sqrt{\rho v}$. Now, if the temperature difference between the surface and the fluid, and also the heating power required to generate this temperature difference, are known, the mass flow over the heating element can thus be determined from this.

Therefore, for practical application of such a thermal mass flow measurement, two temperature sensors, one of which is heated and used for the flow measurement, are now put into the flow as illustrated in FIG. 4. The second temperature sensor serves to measure the fluid temperature $T_F$.

In general, the measurement is in this case carried out only statically with a constant heating power or a constant temperature difference between the heater and the flow. However, a pulsed mode of operation, which is evaluated with slightly more effort, could also be carried out in this case.

However, for all these measurements here it is important that a very accurate measurement of the heating power and the temperature difference is carried out. The quantity of heat given off to the flow can not be measured directly in this case but is rather determined by measuring the electrical heating power used. However, due to the construction, the electrical heating power introduced is not completely given off to the flow directly from the sensor head but a part of the heat flows into the holder of the sensor head and from there it is given off to the surroundings or to the flow at a greater distance from the measuring element. Since this heat flux is included in the measurement of the mass flow, it directly influences the measured result and presents a great source of error when using a thermal mass flow meter. It is partially taken into consideration during the calibration of the mass flow meter. However, since it is very variable, depending in particular on the flow and temperature conditions in the flow, it can be considered only to a limited extent during calibration and thus still presents a great source of error. It is thus attempted to keep this heat-loss flux as low as possible during the development of a thermal mass flow meter in order to achieve a flow measurement that is as accurate as possible.

In order to reduce this influence, it is generally attempted to set the ratio of the direct heat flux into the flow and the losses into the holder to be as great as possible during the development of a thermal mass flow meter. That is to say, a very good thermal contact between the heater and the flow is created and, at the same time, the heat outflow into the holder is reduced by appropriate insulation. A possible embodiment is presented in U.S. Pat. No. 5,880,365. In general, the insulation in this case comprises the entire holder of the sensor head in order to create the best insulation possible.

The insulation achievable is however limited by the mechanical requirements of the holder. By way of example, a very good insulator is a tube filled with air with the thinnest wall thickness possible, since gasses have a much lower thermal conductivity than liquids or solids. However, since the holder in general is subjected to relatively high pressures and also has to hold the sensor head fixedly in its position, the reduction of the wall thickness is limited and often appropriate stabilizers are also installed into the holder, such as, for example, short solid cylinders which are arranged at regular intervals, as a result of which the insulation is decreased. Thus a residual heat-loss flux remains.

Other concepts thus go down the route of measuring the temperature at one or more points in the holder. Subsequently, the heat-loss flux is calculated with the aid of theoretical models of the holder and the sensor head, and this is considered during the determination of the mass flow. However, this concept requires one or more additional temperature measurements for this purpose, which creates increased effort and corresponding costs both in the sensor head and in the attached electronics.

Another disadvantage in this case is that the thermal conductivity inside the holder can be described well theoretically, but a large proportion of the heat is given off to the flow via the surface of the holder. This quantity of heat that is given off depends directly on the local temperatures and the flow velocities of the fluid around the holder, which in general are known only very imprecisely. In particular in the case of very large temperature differences between the housing and the flow, this is difficult to determine, so that the achievable accuracies are also limited as a result.

SUMMARY

Exemplary embodiments disclosed herein can improve the accuracy of the measurement of a known thermal mass flow meter.

A thermal mass flow meter is disclosed with at least one heating element which is mounted on a holder and immersed into a vessel with a flowing medium, wherein the holder is subdivided into two zones of differing thermal conductivity, the holder substantially having a high thermal conductivity adjoined by a short zone of low thermal conductivity in which the heating element is arranged.

In another aspect, a thermal mass flow meter is disclosed, comprising a holder, the holder being subdivided into zones of differing thermal conductivity; and at least one heating element mounted onto the holder for immersion into a vessel having a flowing medium, wherein the holder includes a short zone of low thermal conductivity in which the at least one heating element is arranged.

BRIEF DESCRIPTION OF THE DRAWINGS

The disclosure is explained in more detail below with reference to an exemplary embodiment. The drawings required for this show the following.

DETAILED DESCRIPTION

In order to now increase the accuracy of the measuring process without the constraints described above, it is therefore now suggested that the heat-loss flux is not reduced by the best possible insulation of the sensor head, but rather that the insulation is limited to a short region in the vicinity of the sensor head, and that the rest of the holder is designed with a high conductivity, so that a higher but constant or easily calculated heat flux is established here. If the heat-loss flux is known, since it is constant or can easily be determined, then it can be considered during the determination of the mass flow in a similar manner to the method described above, or it is directly included in the calibration of the sensor. Due to the good thermal contact between the holder and the housing, the holder is thus also approximately at the temperature of the housing, so that the heat exchange between the heat from the heated sensor head and the flow is limited to the region of the sensor head and the insulation, which likewise leads to more stable heat flux conditions in the holder.

Figure 1:
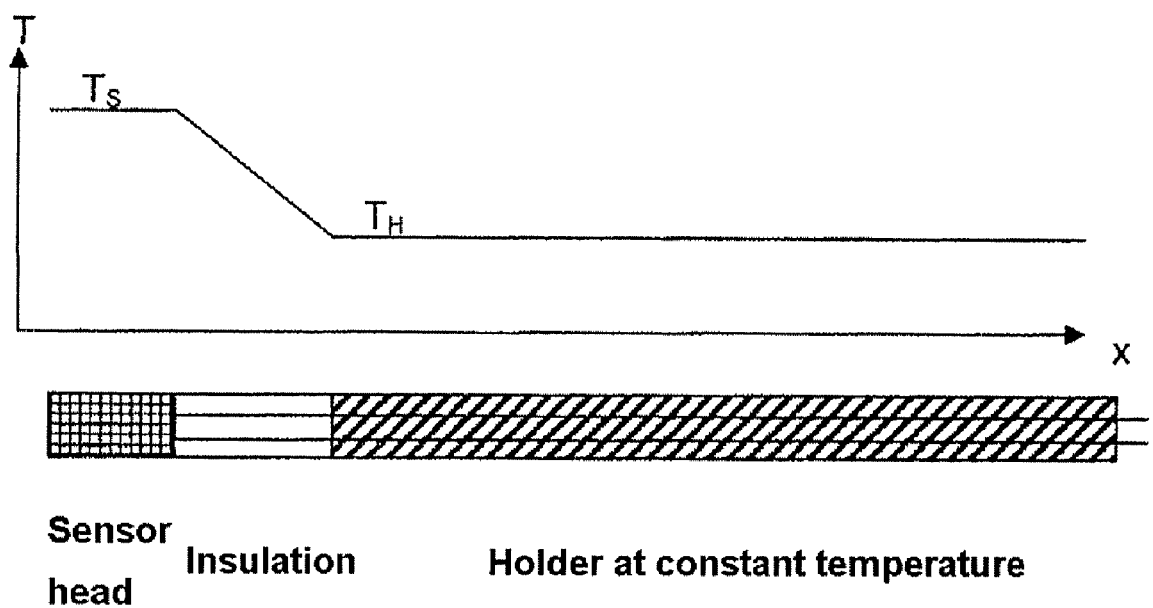
FIG. 1 shows a graphical illustration of an exemplary temperature profile.

FIG. 1 shows a sketch of an exemplary desired temperature profile in the holder. The temperature decrease between the heated sensor head and the housing takes place almost exclusively over the short piece of the insulation, and the other regions are at an at least approximately determinable, constant temperature.

It is thus the principle of this disclosure to create constant and determinable temperature and heat flux conditions within the holder by the highest conductivity possible over a large part of the holder and limiting the insulation to a small region near the sensor head.

According to the exemplary arrangement, with the holder being at the housing temperature, the housing temperature can be much more accessible and no additional temperature sensor must be integrated into the holder. In part, measuring the temperature of the electronics means that the housing temperature can be inferred. Or the holder is thermally decoupled from the housing by means of a further insulation directly on the housing and acquires an average fluid temperature. To a first approximation this corresponds to the temperature measured by the reference sensor.

Both the specific thermal conductivity of the material used and the effective cross section available for thermal conductivity are included in the thermal conductivity of the holder. The holder can be completely filled by a material which is a good thermal conductor in order to achieve the largest conductive cross section possible. Solid and liquid materials are suitable for heat conductors, since their thermal conductivity is considerably higher than that of gasses. That is to say the holder should be solid or filled with a liquid or powder and not have any cavities. In this case, materials which are liquid or in the form of a powder can fill the cross section more completely. Electrically nonconductive materials have a further advantage for the construction of such a holder since they simultaneously serve as insulation for the electrical connection wires for the heater and additional insulation of the wires is not required. A completely filled holder can have high pressure resistance and improved mechanical stability.

Figure 2:
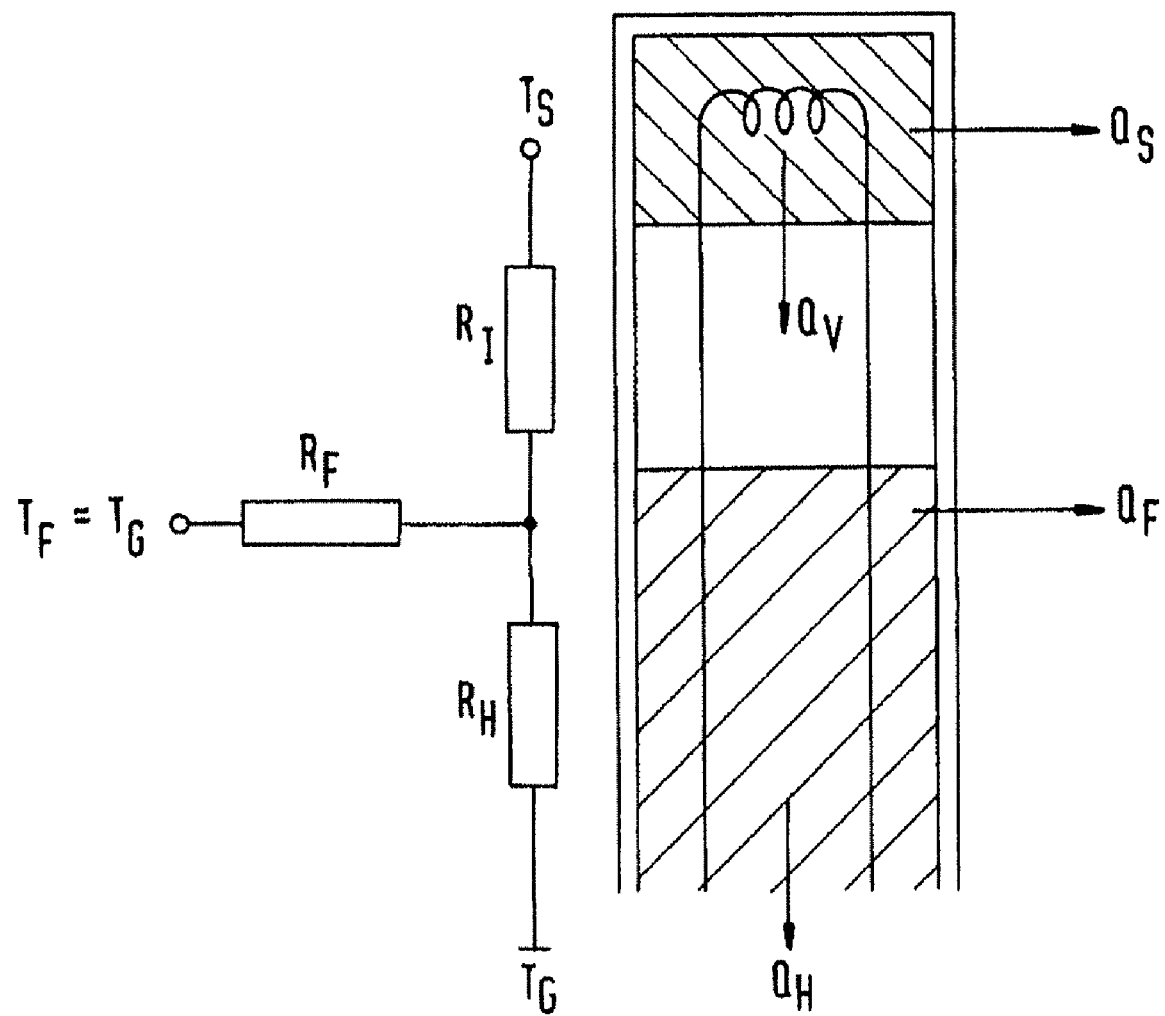
FIG. 2 shows an equivalent circuit diagram for the heat fluxes and thermal resistances.
Figure 3:
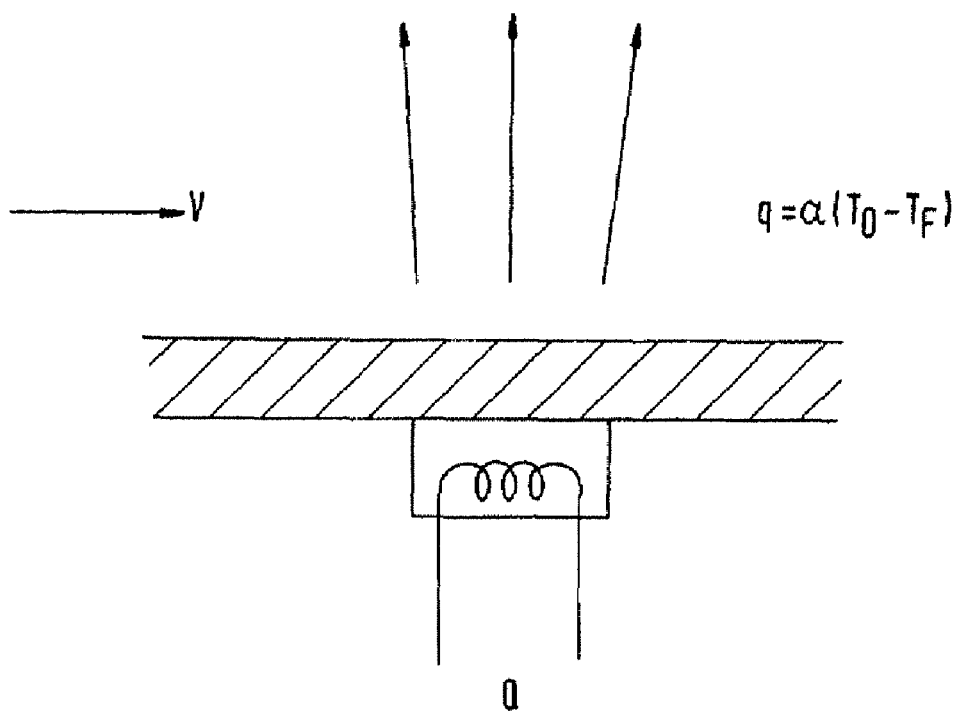
FIG. 3 shows an illustration of the principle of an exemplary thermal mass flow meter.
Figure 4:
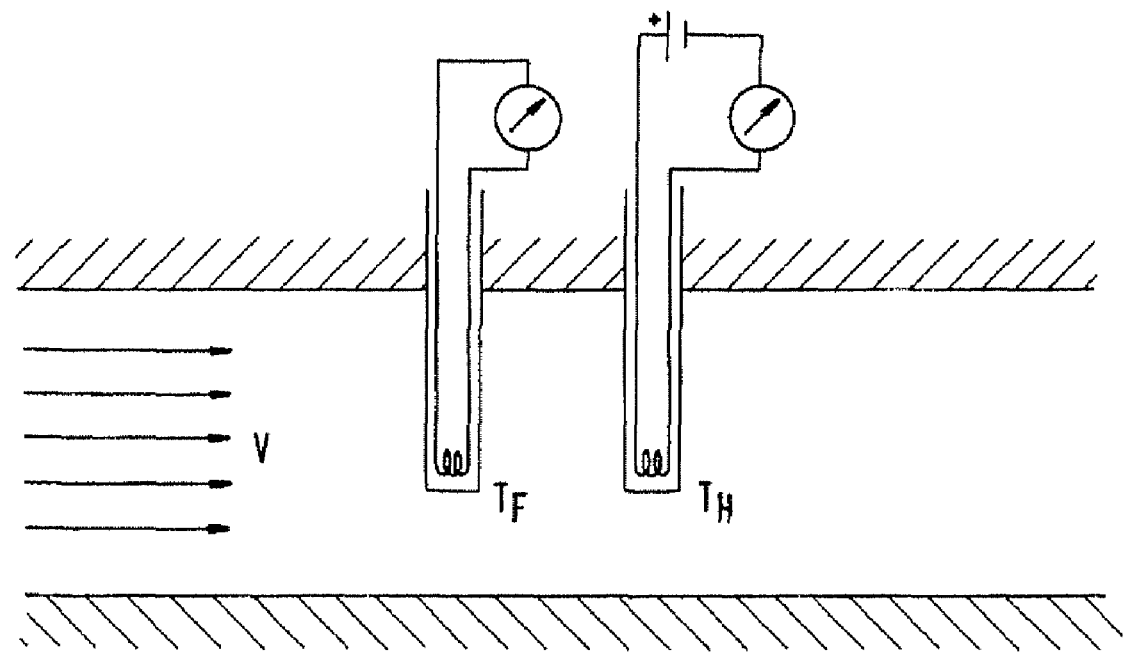
FIG. 4 shows an exemplary measuring arrangement in principle.

FIG. 2 shows a sketch of the heat fluxes and temperatures in such a holder. The actual measuring flow is the heat flow $\dot{Q}_S=(T_S-T_R)/R_S$. However, the electric power $P=\dot{Q}_S+\dot{Q}_V$ is measured, leading to an error in the mass flow determination of $\Delta\dot{m}/\dot{m}\sim\dot{Q}_V/\dot{Q}_S$. In this representation, the loss flow is given by $$\dot{Q}_V = \frac{(T_S - T_G) + (T_S - T_F)R_H/R_F}{R_I(1 + R_H/R_F) + R_H}.$$

Assuming that $R_H \ll R_I$, which is the essence of this disclosure, the loss flow can be approximated by $$\dot{Q}_V \approx \frac{T_S - T_G}{R_I} + \frac{T_S - T_F}{R_I}\frac{R_H}{R_H + R_F}.$$

$T_S$ and $T_G$ are determined during the measurement or estimated, and $R_I$ is constant and determined during calibration. Therefore the first term of the expression is known and can be taken into account when calculating the mass flow. However, the second term includes the fluid temperature in the region of the holder and the local heat transmission coefficient, which continually change during the measurement and cannot be determined. They consequently cannot be taken into account when determining the mass flow and hence produce an error in the mass flow measurement. Thus, for this error, $$\frac{\Delta\dot{m}}{\dot{m}} \sim \frac{T_S - T_F}{T_S - T_R}\frac{R_H}{R_I}\frac{R_S}{R_H + R_F}$$

holds. The temperature ratio here is approximately in the range of 0.5-1 and given by external conditions. Therefore, the resistance ratio has to be chosen appropriately to reduce the relative error. The resistances $R_H$ and $R_I$ are inversely proportional to their thermal conductivity, and in the case of given geometric conditions, the error thus becomes $$\frac{\Delta\dot{m}}{\dot{m}} \sim \frac{\lambda_I}{c + \lambda_H},$$

where c depends on the external flow. This here shows that the error in the mass flow determination can be reduced by a thermal conductivity which is as low as possible in the insulation region, but in particular also by a large increase in the thermal conductivity in the region of the holder. If $\lambda_H \gg c$, then the error is directly determined by the ratio $\lambda_I/\lambda_H$.

The holder is substantially formed by a metal tube. Connection conductors which are insulated from one another and are connected to the heating element are arranged in the interior of the metal tube. In an exemplary embodiment of the disclosure, the insulation is formed by a pressed metal oxide. The heating element is arranged in a thermally insulated manner with respect to the metal tube at that end of the metal tube which protrudes into the vessel.

The section of the holder with a low thermal conductivity is formed by a metal tube in which the connection conductors of the heating element are arranged in a gas-insulated manner with respect to the metal tube. In another exemplary embodiment of the disclosure, the connection conductors are air-insulated with respect to the metal tube. In a further refinement of the disclosure, the metal tube comprises an alloyed, stainless steel.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A thermal mass flow meter with at least one heating element which is mounted on a holder and immersed into a vessel with a flowing medium,
wherein
the holder is subdivided into two zones of differing thermal conductivity, the holder substantially having a high thermal conductivity adjoined by a short zone of low thermal conductivity in which the heating element is arranged.

2. The mass flow meter as claimed in claim 1,
wherein
the zone of high thermal conductivity of the holder is thermally connected to the vessel.

3. The mass flow meter as claimed in claim 1,
wherein
the zone of high thermal conductivity of the holder is thermally insulated from the vessel.

4. The mass flow meter as claimed in claim 3,
wherein
the holder has a reference sensor which is arranged in the zone of high thermal conductivity.

5. The mass flow meter as claimed in claim 1,
wherein
the holder is formed by a metal tube, in the interior of which a plurality of electrical conductors for connection to the heating element are arranged insulated from each other.

6. The mass flow meter as claimed in claim 1,
wherein
the section of the holder of low thermal conductivity is formed by a metal tube, in which the connection conductors of the heating element are arranged in a gas-insulated manner with respect to the metal tube.

7. The mass flow meter as claimed in claim 6,
wherein
the connection conductors of the heating element are air-insulated with respect to the metal tube.

8. The mass flow meter as claimed in claim 6,
wherein
the metal tube comprises an alloyed, stainless steel.

9. The mass flow meter as claimed in claim 4,
wherein
the holder is formed by a metal tube, in the interior of which a plurality of electrical conductors for connection to the heating element are arranged insulated from each other.

10. The mass flow meter as claimed in claim 5,
wherein
the section of the holder of low thermal conductivity is formed by a metal tube, in which the connection conductors of the heating element are arranged in a gas-insulated manner with respect to the metal tube.

11. The mass flow meter as claimed in claim 7,
wherein
the metal tube comprises an alloyed, stainless steel.

12. A thermal mass flow meter, comprising:
a holder, the holder being subdivided into zones of differing thermal conductivity; and
at least one heating element mounted onto the holder for immersion into a vessel having a flowing medium,
wherein the holder includes a short zone of low thermal conductivity in which the at least one heating element is arranged.

* * * * *